Figure 1:
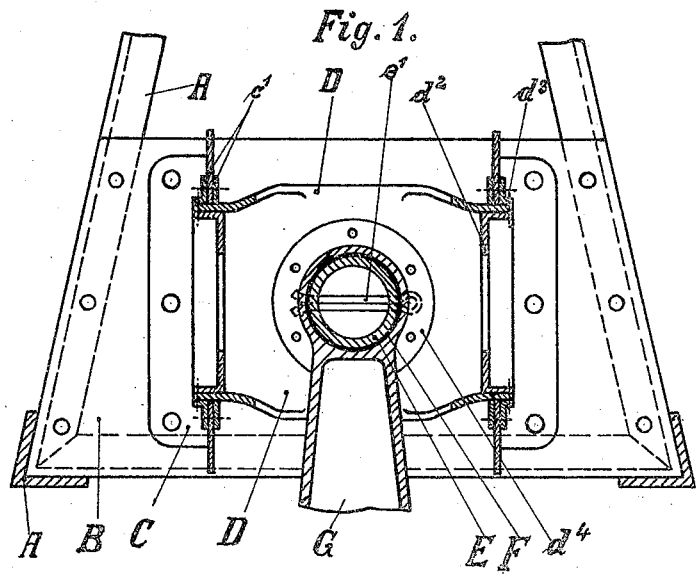

K. STAHL.
CARDANIC SUSPENSION.
APPLICATION FILED JUNE 28, 1920.

1,419,176.

Patented June 13, 1922.

INVENTOR:
Karl Stahl.

UNITED STATES PATENT OFFICE.

KARL STAHL, OF FRIEDRICHSHAFEN, GERMANY, ASSIGNOR TO THE FIRM LUFT-SCHIFFBAU ZEPPELIN GESELLSCHAFT MIT BESCHRANKTER HAFTUNG, OF FRIEDRICHSHAFEN, GERMANY.

CARDANIC SUSPENSION.

1,419,176.  Specification of Letters Patent.  Patented June 13, 1922.

Application filed June 28, 1920. Serial No. 392,599.

*To all whom it may concern:*

Be it known that I, KARL STAHL, a citizen of the German Empire, residing at Friedrichshafen, Germany, have invented certain new and useful Improvements in Cardanic Suspensions (for which I have filed an application in Germany Sept. 12, 1917), of which the following is a specification.

This invention relates to cardanic suspensions and especially to such devices which, in spite of their minimum specific weight, permit of carrying considerable loads with safety.

The necessity of providing a perfectly adjustable bearing exists for instance for the suspension points of airship cars relatively to the frame proper. For various reasons, the cars must be arranged at a certain distance from the frame, for which purpose they are connected with the frame by a number of struts. To avoid sticking in mounting and to ensure a certain flexibility during concussions, both in operation and in the case of landings, cardanic suspension joints are preferably used. As there are only few bearing points, they have to take up considerable loads. On the other hand, they must combine great safety in operation and a minimum weight, corresponding to the peculiarity in airship construction. All these requirements are complied with by using a device specially constructed for the purpose.

In accordance therewith the object of the invention is a cardanic suspension, to be used especially for heavy loads in airship constructions, in which a hollow body, which is rotatable at its ends and having the form of a socket, serves in its middle portion as a bearing for the load carrier. The latter consists preferably of a hollow body of greater open width. In accordance with the invention, the longitudinal axis of both hollow bodies coincides with the revolving axis, so that pins etc. may be entirely dispensed with. By this means, the manufacture of such devices is greatly facilitated, whilst on the other hand a very low surface pressure and consequently a great working safety of the moving parts is ensured, since the tubular bodies offer large bearing surfaces, besides possessing considerable stiffness, in spite of their low weight.

A specially simple and highly resistable bearing is obtained by employing a load-carrier, which consists of a tube, which rests in a tube of greater open width, flattened in its middle and provided with annular reinforcements both in the middle and at its ends. As bearing surface for the latter, plain annular guides in the frame may be used. An essential advantage of the invention consists in the fact that, even in the case of considerable loads, rolled, compressed or drawn tubes and pieces of sheet-iron may be employed for all moving parts and their bearings, without taking recourse to heavy castings, which are difficult to handle.

Figure 2:
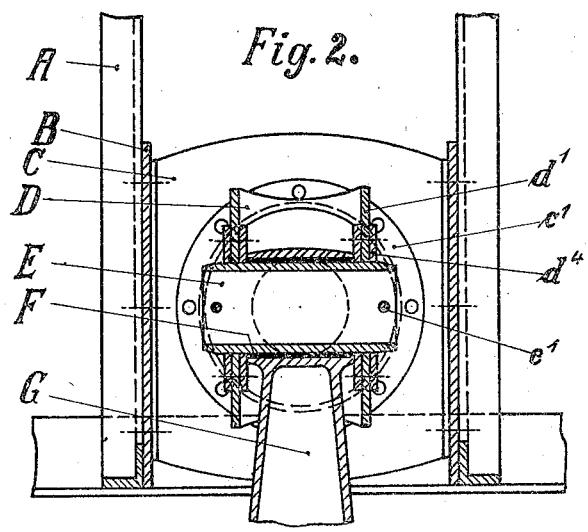

In the accompanying drawings one modification of my invention is illustrated by way of example. Figs. 1 and 2 are diagrammatic views of two vertical axial sections taken at right angles of the upper suspension point of the strut of a car.

Two sheet-iron braces B, provided in the lower part of a frame-carrier A, are screwed to two carrying plates C, so as to form a box-shaped frame. The carrying plates C are each provided with a circular opening, reinforced by riveted rings $c^1$ in the common direction of their axis. These grooves serve as bearings for a socket-pipe D, which is slit in its middle portion along two diametrical mantle-lines and formed into a frame-shaped body with two flat walls $d^1$, parallel with each other. The socket-tube D is reinforced at its ends by means of two internal angular rings $d^2$ and provided at the outside of its bearing surface with guide rings $d^3$, so as to avoid axial displacement relatively to the carrying plates C, the walls $d^1$ of the socket-pipe D are provided with a circular opening, reinforced by riveted rings $d^4$, in which grooves a tube E, which serves as a load-carrier, secured by pins $e^1$, is rotatably arranged. The axes of the tubes D and E intersect each other at right angles. The part of the tube E, arranged between the walls $d^1$, is surrounded by a sleeve F, which serves as a bearing for the head-piece of a car-strut G.

I claim:

1. In aircraft construction in combination, a cardanic support comprising substantially upright supporting plates, a substantially tubular bearing journalled in said plates, a load carrying sleeve journalled in said bearing at right angles thereto and means to support the load from said sleeve.

2. In aircraft construction in combination, a cardanic support comprising substantially upright supporting plates, a substantially tubular bearing journalled in said plates, said bearing having flattened side portions, a load carrying sleeve journaled in said side portions at right angles thereto and means to support the load from said sleeve.

In testimony whereof I affix my signature.

KARL STAHL.